US010089260B2

(12) United States Patent
Lo et al.

(10) Patent No.: US 10,089,260 B2
(45) Date of Patent: Oct. 2, 2018

(54) CONTROL METHOD AND SYSTEM FOR ACCESSING DATA AMONG DIFFERENT ELECTRONIC DEVICES

(71) Applicant: MediaTek Inc., Hsin-Chu (TW)

(72) Inventors: JenChieh Lo, Zhushan Township, Nantou County (TW); Yu-Cheng Chang, Chiayi (TW); Shu-Hsin Chang, Hsinchu (TW); Chun-Hsiung Hu, Hsinchu (TW); Ching-Chieh Wang, Luodong Township, Yilan County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/948,040

(22) Filed: Nov. 20, 2015

(65) Prior Publication Data
US 2016/0232114 A1 Aug. 11, 2016

Related U.S. Application Data

(60) Provisional application No. 62/114,276, filed on Feb. 10, 2015.

(51) Int. Cl.
G06F 13/40 (2006.01)
G06F 13/20 (2006.01)
G06F 3/06 (2006.01)
G06F 13/38 (2006.01)

(52) U.S. Cl.
CPC .......... G06F 13/20 (2013.01); G06F 13/4068 (2013.01)

(58) Field of Classification Search
None
See application file for complete search history.

(56) References Cited

U.S. PATENT DOCUMENTS

| 7,334,157 B1 | 2/2008 | Graf et al. |
| 9,268,552 B1 | 2/2016 | Kiiskila et al. |
| 2003/0195951 A1 | 10/2003 | Wittle, Jr. et al. |
| 2005/0102462 A1 | 5/2005 | Choi |
| 2005/0216717 A1 | 9/2005 | Wong et al. |
| 2005/0257215 A1 | 11/2005 | Denby et al. |
| 2008/0071962 A1* | 3/2008 | Yang ..................... G06F 9/4411 710/313 |
| 2008/0127165 A1 | 5/2008 | Mullis et al. |
| 2008/0301671 A1 | 12/2008 | Kim |
| 2008/0320501 A1* | 12/2008 | Li ....................... G06F 9/45537 719/324 |

(Continued)

Primary Examiner — Scott Sun
(74) Attorney, Agent, or Firm — McClure, Qualey & Rodack, LLP

(57) ABSTRACT

A system for accessing data among at least two different electronic devices is provided. The system includes a demanding electronic device and a providing electronic device. The demanding electronic device is utilized to establish an input virtual device to execute an application on the demanding electronic device. The providing electronic device is utilized to establish an output virtual device for transmitting data from the providing electronic device to the demanding electronic device via the output virtual device, wherein the data corresponds to the application, and the providing electronic device is physically separated from the demanding electronic device. The input virtual device is established to use a first peripheral of the providing electronic device as a built-in peripheral of the demanding electronic device.

16 Claims, 9 Drawing Sheets

(56) References Cited

U.S. PATENT DOCUMENTS

| | | | |
|---|---|---|---|
| 2009/0113416 A1 | 4/2009 | Bealkowski et al. | |
| 2014/0032644 A1* | 1/2014 | Saxena | H04L 67/10 709/203 |
| 2014/0119765 A1 | 5/2014 | Hosoda | |
| 2015/0169484 A1 | 6/2015 | Lu | |

* cited by examiner

CONTROL METHOD AND SYSTEM FOR ACCESSING DATA AMONG DIFFERENT ELECTRONIC DEVICES

CROSS REFERENCE TO RELATED APPLICATIONS

This application claims the benefit of U.S. Provisional Application No. 62/114,276, filed on Feb. 10, 2015, the entirety of which is incorporated by reference herein.

BACKGROUND OF THE INVENTION

Field of the Invention

The present inventive concept relates to a control method and a system for accessing data among at least two different electronic devices by establishing at least one virtual device.

Description of the Related Art

Users will often utilize their electronic devices to run various applications. However, not all electronic devices are equipped with sufficient peripheral hardware to execute these applications. For example, it is impossible to execute a camera application using a television having no camera hardware, because it lacks camera hardware. If the user wants to use the camera of another of his electronic devices, the user has to install specific, customized applications on his own electronic device for archiving and controlling the remote hardware of other electronic devices. Because the installed application is a client-side application and the corresponding application is server-side, this solution may cause some problems. In addition, this method also demands a lot of effort and time for the user to install and use these applications. Therefore, a user-friendly and efficient method is required for the user to cross mount a plurality of electronic devices.

BRIEF SUMMARY OF THE INVENTION

The invention discloses a cross-platform mechanism of mounting one or more electronic devices. The control method of the invention includes automatically setting up virtual devices, simulating real hardware via the virtual devices for the purpose of executing a specific application, and automatically transferring data between the input virtual device and the output virtual device. Therefore, users don't need to install any particular custom application in order to utilize the remote hardware of other electronic devices. By utilizing the control method of the present invention, all electronic devices are allowed to execute applications without hardware limitations by mounting other electronic devices. Therefore, the control method and system can solve the problem described above.

In one aspect of the disclosure, a control method is provided for a demanding electronic device to execute an application on the demanding electronic device. The control method includes establishing an input virtual device on the demanding electronic device for using a first peripheral of a providing electronic device as a built-in peripheral of the demanding electronic device, and accessing data to the providing electronic device or from the providing electronic device via the input virtual device, wherein the data corresponds to the application. The providing electronic device is physically separated from the demanding electronic device.

In some embodiments, the control method further includes determining whether the current hardware resources of the demanding electronic device are sufficient to execute the application before the step of establishing the input virtual device on the demanding electronic device. When it is determined that the current hardware resources of the demanding electronic device are insufficient to execute the application, the input virtual device is established on the demanding electronic device. Furthermore, the control method includes searching for the providing electronic device via the demanding electronic device before the step of establishing the input virtual device on the demanding electronic device. After the step of searching for the providing electronic device, the control method further includes authenticating the providing electronic device, establishing a connection with the providing electronic device via the demanding electronic device, and exchanging information about the first peripheral of the providing electronic device. The input virtual device comprises program codes of software and/or firmware of the demanding electronic device.

In another aspect of the disclosure, a control method is provided for a providing electronic device to support a demanding electronic device for executing an application on the demanding electronic device. The control method includes establishing an output virtual device on the providing electronic device for transmitting data from a first peripheral of the providing electronic device to the demanding electronic device, and transmitting the data from the first peripheral of the providing electronic device to the demanding electronic device via the output virtual device. The providing electronic device is physically separated from the demanding electronic device. And the first peripheral of the providing electronic device is utilized as a built-in peripheral of the demanding electronic device and the data corresponds to the application. In addition, the control method also includes feeding back a search for the providing electronic device via the demanding electronic device before the step of establishing the output virtual device on the providing electronic device.

In another aspect of the disclosure, a system for accessing data among at least two different electronic devices is provided. The system includes a demanding electronic device and a providing electronic device. The demanding electronic device is utilized to establish an input virtual device to execute an application on the demanding electronic device. The providing electronic device is utilized to establish an output virtual device for transmitting data from the providing electronic device to the demanding electronic device via the output virtual device, wherein the data corresponds to the application, and the providing electronic device is physically separated from the demanding electronic device. The input virtual device is established to use a first peripheral of the providing electronic device as a built-in peripheral of the demanding electronic device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

The following description is of the best-contemplated mode of carrying out the invention. This description is made for the purpose of illustrating the general principles of the invention and should not be taken in a limiting sense. Certain terms and figures are used throughout the description and following claims to refer to particular components. As one skilled in the art will appreciate, manufacturers may refer to a component by different names. This document does not intend to distinguish between components that differ in name but not function. The terms "component", "system" and "device" used in the present invention could be the entity relating to the computer which is hardware, software, or a combination of hardware and software. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
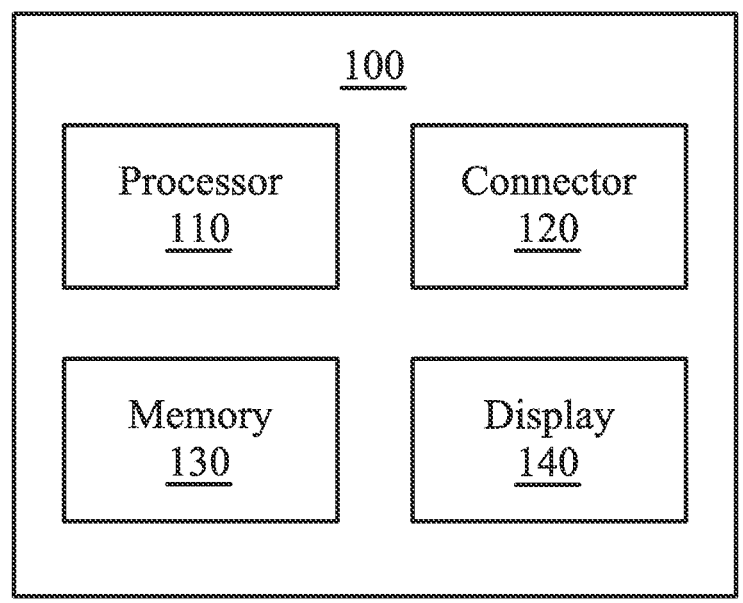
FIG. 1 is a schematic diagram illustrating an electronic device according to an embodiment of the invention.

FIG. 1 is a schematic diagram illustrating an electronic device 100 according to an embodiment of the invention. The electronic device 100 could be a portable electronic device which provides wireless network service and network connection such as a cell phone, a tablet computer, a laptop computer or a PDA, or could it be non-portable electronic apparatus such as a television set, a desktop computer, or a server. As shown in FIG. 1, the electronic device 100 includes a processor 110, a connector 120, a memory 130 and a display 140. The processor 110 could include a digital signal processor (DSP), a microcontroller (MCU), a central-processing unit (CPU) or a plurality of parallel processors relating a parallel processing environment to implement the operating system (OS), firmware, driver and/or other applications of the electronic device 100. The connector 120 is utilized to perform wireless communication between different electronic devices 100 based on various protocols. The protocol of wireless communication could constitute GSM, GPRS, EDGE, UMTS, W-CDMA, CDMA2000, TD-CDMA, Bluetooth, NFC, WiFi, WiMAX, LTE, LTE-A or TD-LTE.

In addition, the memory 130 includes one or more of a random access memory (RAM), a read-only memory (ROM), a flash memory, a hard disk, a soft disk, a magnetic memory, a compact disc (CD) and a digital video disk (DVD). The display 140 is utilized to display content from the electronic device 100. Specifically, the display 140 could be a touch display panel, such as resistive touch panels, capacitive touch panels, optical touch panels or electromagnetic touch panels. Furthermore, in some embodiments, the electronic device 100 may also include other hardware such as a speaker, a camera, a sensor (such as light sensor or color sensor, a temperature sensor, a humidity sensor), a barometer, an antenna, a GPS receiver, a haptic device, an accelerometer, a speedometer and/or a health monitor.

Figure 2A:
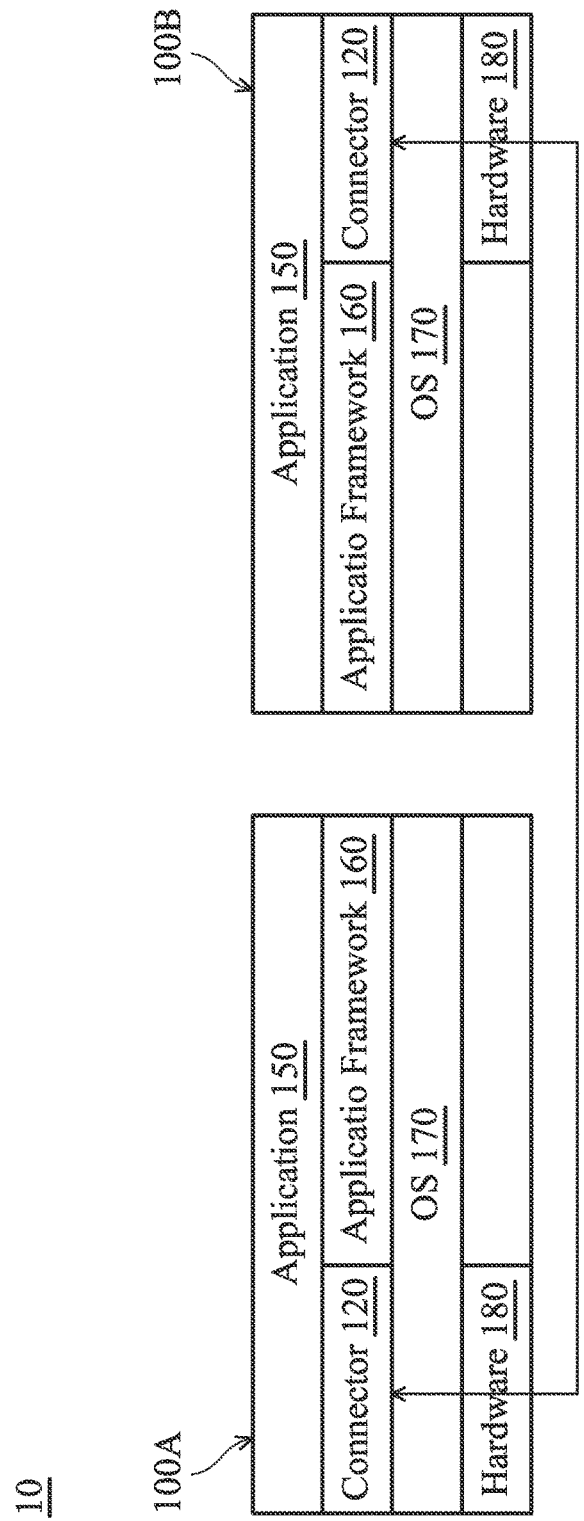
FIG. 2A to FIG. 2C are schematic diagrams illustrating a demanding electronic device and a providing electronic device according to an embodiment of the invention.
Figure 2B:
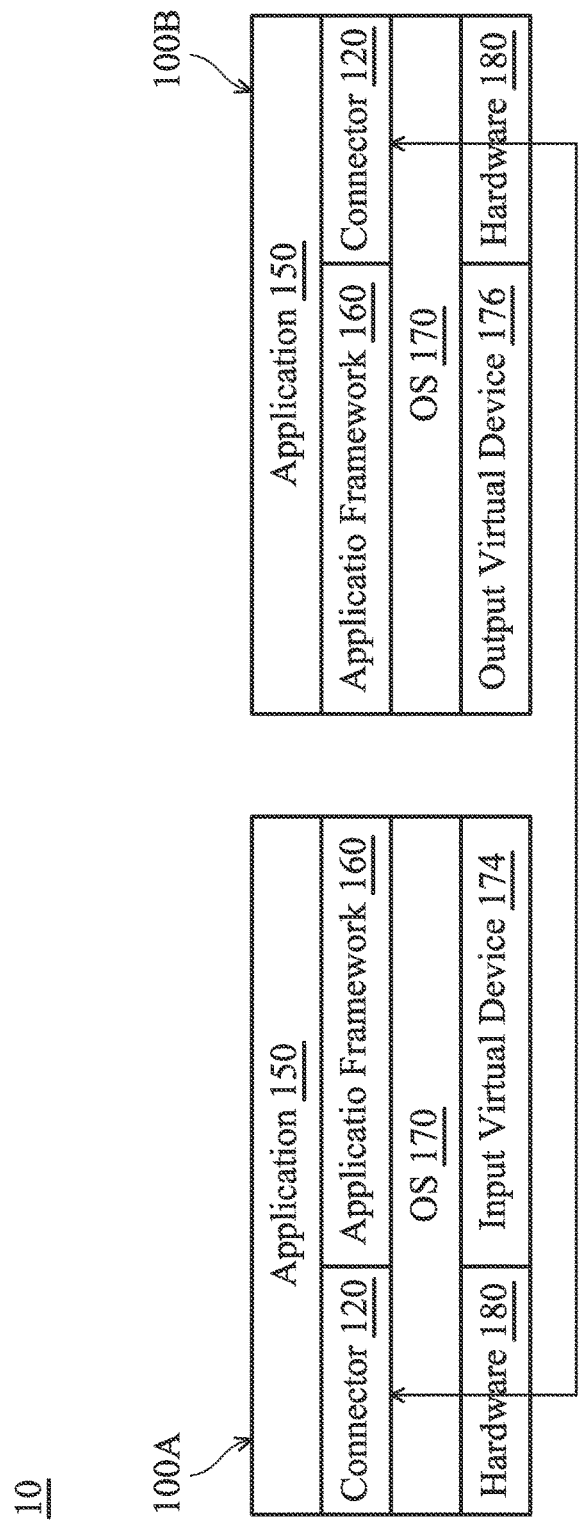
Figure 2C:
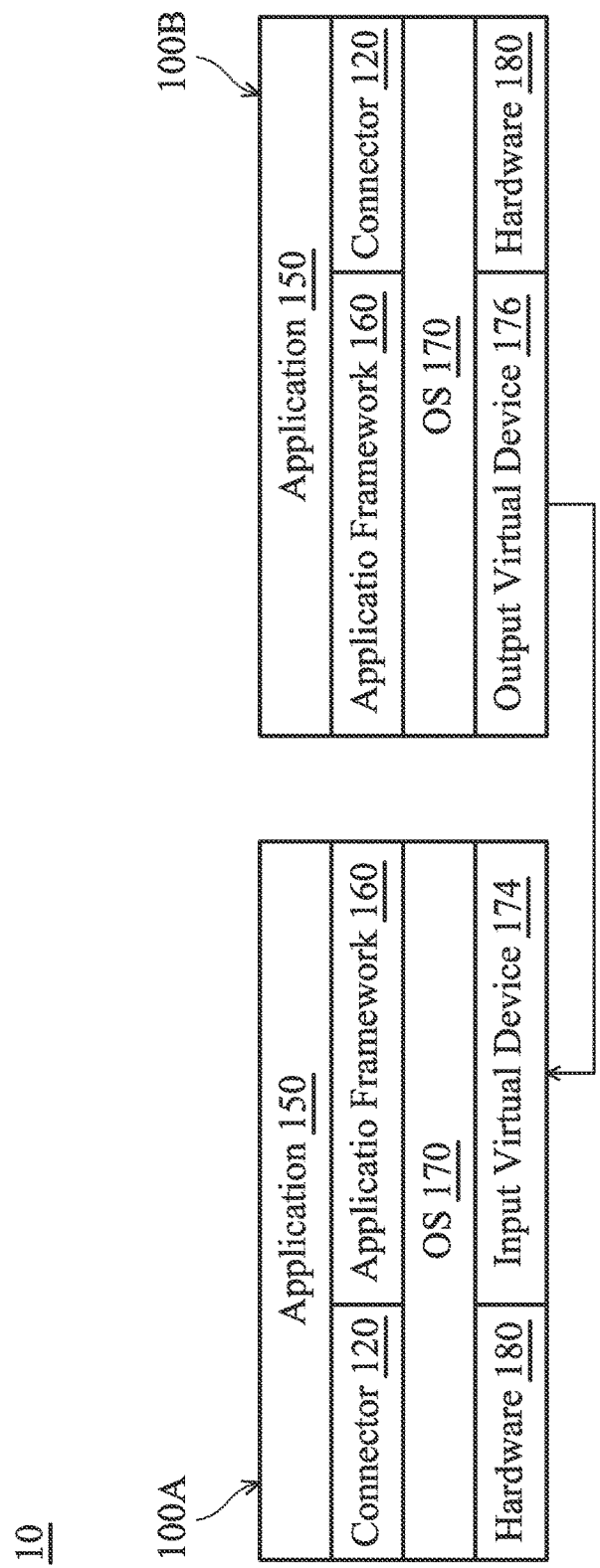

However, the electronic device 100 may not always have the hardware necessary to execute a specific application. For example, the electronic device 100 is a television without a camera, and it may not be able to execute an application for taking photos. The present invention provides an efficient and user-friendly control method for the electronic device 100 to overcome the deficiencies of its own hardware and to be able to operate the specific application. FIG. 2A to FIG. 2C are schematic diagrams illustrating a system 10 which includes a demanding electronic device 100A and a providing electronic device 100B according to an embodiment of the invention. The demanding electronic device 100A and the providing electronic device 100B are similar to the electronic device 100 as shown in FIG. 1. Specifically, each of the demanding electronic device 100A and the providing electronic device 100B includes a connector 120, an application 150, an application framework 160, an operating system (OS) 170 and hardware 180. The application 150, the application framework 160 and the OS 170 could be performed by the processor 110 as shown in FIG. 1. The hardware 180 could include many different types of components, such as a speaker, a camera, and a sensor.

As shown in FIG. 2A, the demanding electronic device 100A performs a searching process to discover other electronic devices. Specifically, the connector 120 of the demanding electronic device 100A is utilized to search for other electronic devices based on some discovery protocols, such as the UPNP (Universal Plug And Play) protocol or the mDNS (multicast Domain Name System) protocol. In one embodiment, the connector 120 of the providing electronic device 100B feeds back the results of the search for the demanding electronic device 100A. Afterwards, the connection could be developed between the demanding electronic device 100A and the providing electronic device 100B by their connectors 120. Furthermore, the providing electronic device 100B could also execute the searching process for finding the demanding electronic device 100A. It should be noted that, in some embodiments, the search process is automatically executed without input from users.

After a connection has been established between the demanding electronic device 100A and the providing electronic device 100B, the input virtual device 174 of the demanding electronic device 100A and the output virtual device 176 of the providing electronic device 100B are respectively developed as shown in FIG. 2B. The input virtual device 174 includes program codes of the software and/or firmware of the demanding electronic device 100A, and the output virtual device 176 includes program codes of software and/or firmware of the providing electronic device 100B. The input virtual device 174 is utilized to simulate the functions of real hardware for the demanding electronic device 100A to execute the specific application. The deficiency of not being able to execute the specific application is compensated for by developing the input virtual device 174. Afterwards, as shown in FIG. 2C, the output virtual device 176 transmits data from the providing electronic device 100B to the demanding electronic device 100A. The transmitted data is obtained by the hardware of the providing electronic device 100B, and the demanding electronic device 100A lacks the hardware. By developing the input virtual device 174 and the output virtual device 176, the hardware of the providing electronic device 100B could be utilized by the demanding electronic device 100A to compensate for its deficiency.

Figure 3:
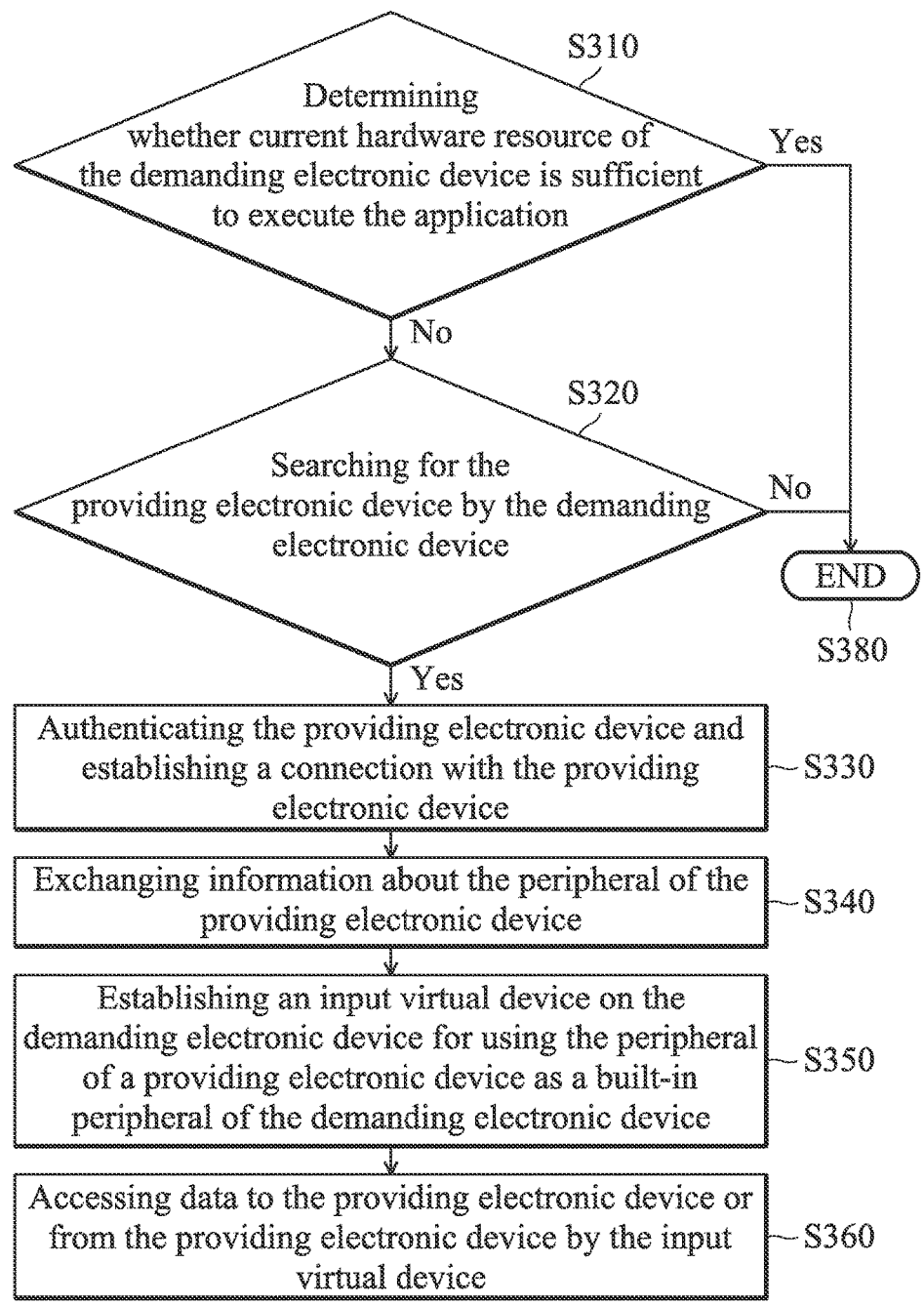
FIG. 3 is a flowchart illustrating a control method for the demanding electronic device according to an embodiment of the invention.

FIG. 3 is a flowchart illustrating a control method for the demanding electronic device 100A according to an embodiment of the invention. In step S310, whether the current hardware resources of the demanding electronic device 100A are sufficient to execute the specific application is determined. If the processor 110 of the demanding electronic device 100A determines that the current hardware resources of the demanding electronic device 100A can afford to execute the specific application, the control method ends as shown in step S380. If the processor 110 of the demanding electronic device 100A determines that the current hardware resources of the demanding electronic device 100A cannot afford to execute the specific application, step S320 will be executed to utilize the hardware resources of other electronic devices. In step S320, the demanding electronic device 100A searches for the providing electronic device 100B. If the providing electronic device 100B is not found by and connected to the demanding electronic device 100A, the control method ends as shown in step S380. If the providing electronic device 100B is found by and connected to the demanding electronic device 100A, step S330 is executed.

In step S330, the demanding electronic device 100A authenticates the providing electronic device 100B and establishes a connection with the providing electronic device 100B. Specifically, an authentication process will be needed for the demanding electronic device 100A to identify the providing electronic device 100B or for the providing electronic device 100B to identify the demanding electronic device 100A. For example, the authentication process could be implemented by inputting passwords, or it could be inputting the instruction of accepting or rejecting the authentication. After the authentication, the connection between the demanding electronic device 100A and the providing electronic device 100B will be developed. Details relating to the mechanism for developing the connection between the demanding electronic device 100A and the providing electronic device 100B have been illustrated in FIG. 2A to FIG. 2C, and will not be repeated again.

In step S340, information about the peripheral of the providing electronic device 100B is exchanged. The peripheral is the hardware needed by the demanding electronic device 100A to execute the specific application. Therefore, information about the peripheral will be obtained in the control method, such as the detailed specifications and function of the peripheral. In addition, the communication channel between the demanding electronic device 100A and the providing electronic device 100B are confirmed to transmit and receive data with each other. For example, the communication channel could be based on the UPNP protocol, the mDNS protocol, or other protocols such as GSM, GPRS, EDGE, UMTS, W-CDMA, CDMA2000, TD-CDMA, Bluetooth, NFC, WiFi, WiMAX, LTE, LTE-A or TD-LTE.

Afterwards, in step S350, an input virtual device 174 is established on the demanding electronic device 100A for using the peripheral of the providing electronic device 100B as a built-in peripheral of the demanding electronic device 100A. The input virtual device 174 includes program codes of software and/or firmware of the demanding electronic device 100A to handle interactions with the OS 170. Therefore, the input virtual device 174 could emulate the real hardware of the peripheral of the providing electronic device 100B, and the functions of the peripheral of the providing electronic device 100B could be utilized by the demanding electronic device through the input virtual device 174. In step S360, the input virtual device 174 accesses data to the providing electronic device 100B or from the providing electronic device 100B. In other words, by establishing the input virtual device 174, the demanding electronic device 100A could operate in such a way that the peripheral has been embedded within itself. Since the connection and the input virtual device 174 are automatically developed by the demanding electronic device 100A, users do not need to expend effort. Therefore, the control method provided by the present invention is user-friendly and could be easily utilized by users.

Figure 4:
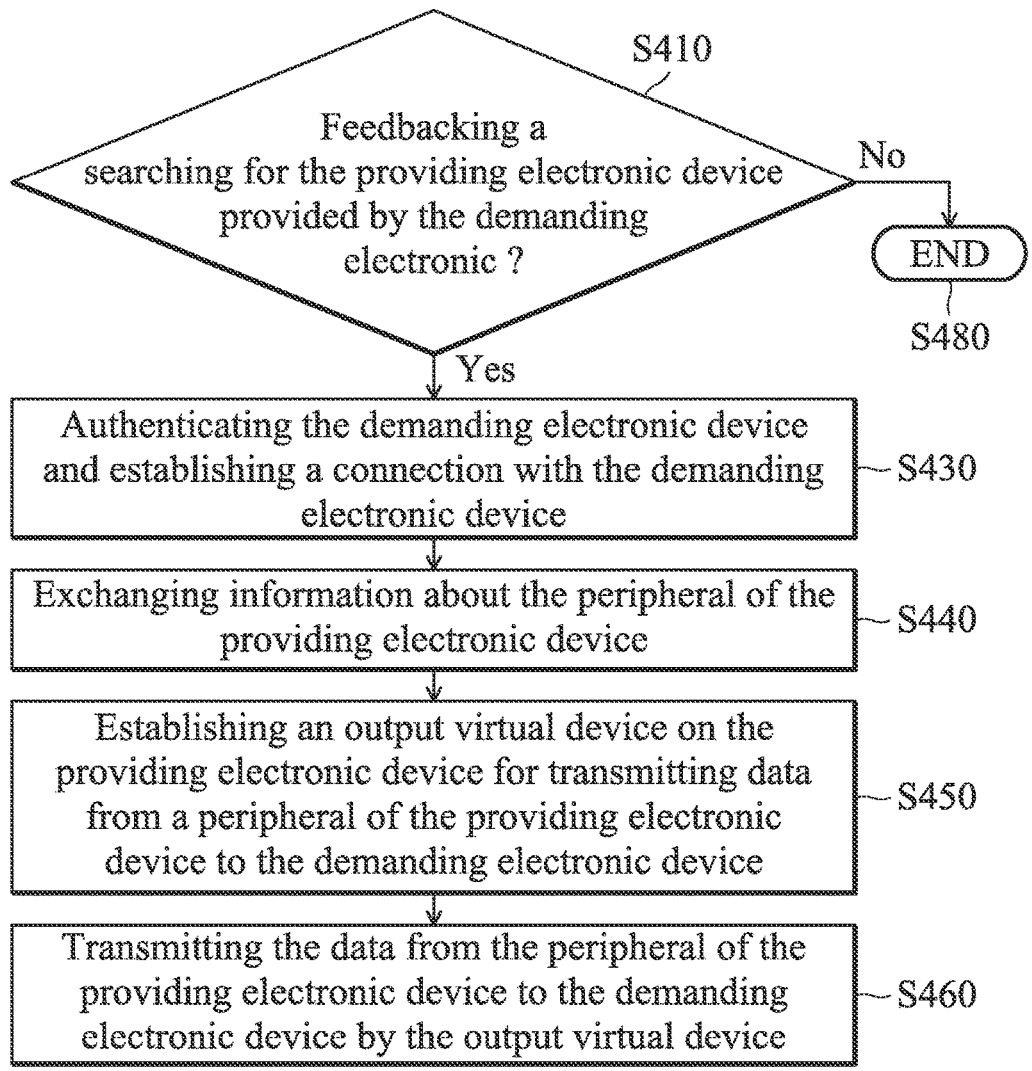
FIG. 4 is a flowchart illustrating a control method for the providing electronic device according to an embodiment of the invention.

FIG. 4 is a flowchart illustrating a control method for the providing electronic device 100B according to an embodiment of the invention. In step S410, the providing electronic device 100B feeds back details of the search provided by the demanding electronic device 100A. If the providing electronic device 100B does not feedback a searching provided by the demanding electronic device 100A, the control method ends as shown in the step S480. If the providing electronic device 100B feedbacks a searching provided by the demanding electronic device 100A, step S430 will be executed for authenticating the demanding electronic device 100A and establishing a connection with the demanding electronic device 100A. Afterwards, in step S440, information about the peripheral of the providing electronic device 100B is exchanged. The information about the peripheral could include the detailed specifications and function of the peripheral. The detailed mechanisms for developing the connection, authentication, and exchanging of information have been illustrated in FIG. 3, and will not be repeated again.

In step S450, an output virtual device 176 is established on the providing electronic device 100B for transmitting data from a peripheral of the providing electronic device 100B to the demanding electronic device 100A. Afterwards, in step S460, the data is transmitted from the peripheral of the providing electronic device 100B to the demanding electronic device 100A by the output virtual device 176. By developing the input virtual device 174 and the output virtual device 176, the demanding electronic device 100A could emulate the real hardware of the peripheral of the providing electronic device 100B. Therefore, the peripheral of the providing electronic device 100B could be utilized by the demanding electronic device to execute the specific application through the input virtual device 174 and the output virtual device 176.

Figure 5:
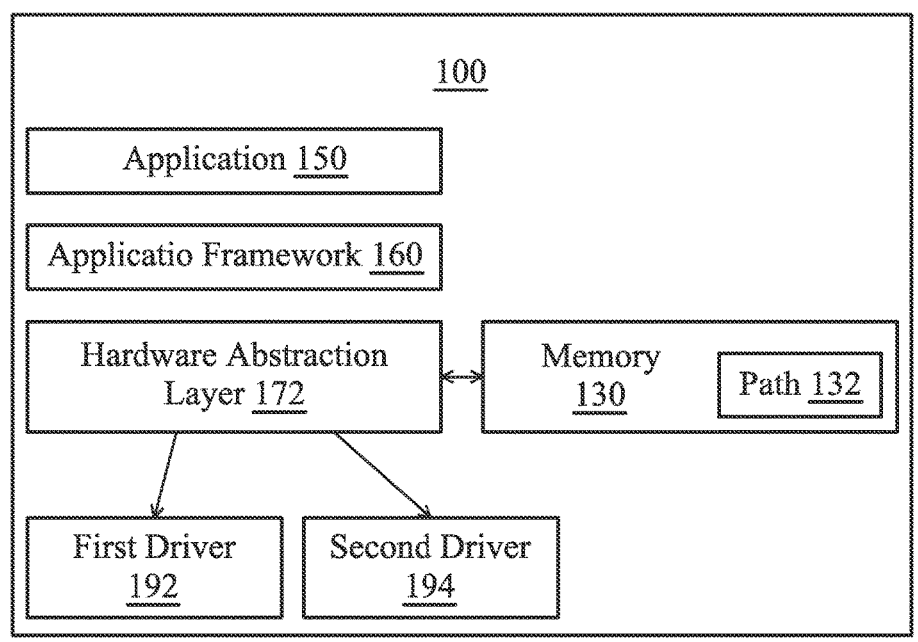
FIG. 5 is another schematic diagram illustrating an electronic device according to an embodiment of the invention.

FIG. 5 is another schematic diagram illustrating an electronic device 100 according to an embodiment of the invention. The electronic device 100 includes the application 150, the application framework 160, the hardware abstraction layer (HAL) 172, the memory 130, the first driver 192 and the second driver 194. The application 150 could include home application, dialer application, SMS/MMS application, IM application, browser application, camera application, alarm application, calculator application, contacts application, voice dial application, email application, calendar application, media player application, photo album application and clock application. The application framework 160 could include activity manager framework, window manager framework, content providers framework, view system framework, notification manager framework, package manager framework, telephone manager framework, resource manager framework and location manager framework.

The driver (such as first driver 192 or the second driver 194) is utilized to drive its corresponding hardware so that the corresponding hardware could be utilized by the electronic device 100. Since the electronic device 100 could include various kinds of hardware, there could also be various corresponding drivers such as a display driver, a camera driver, a Bluetooth driver, a memory driver, a binder (IPC) driver, a USB driver, a keypad driver, an audio driver, a power management driver, a GPS driver or a WiFi driver. In addition, the hardware abstraction layer (HAL) 172 is utilized to link with one of the drivers and functions as the connection between the software and hardware of the electronic device 100. The hardware abstraction layer 172 could include graphics HAL, audio HAL, camera HAL, Bluetooth HAL, GPS HAL, radio HAL and WiFI HAL. Furthermore, libraries (not shown) could also be arranged between the application framework 160 and the hardware abstraction layer 172. The libraries could include surface manager library, media framework library, SQLite library, WebKit library, Libc library, audio manager library, FreeType library and SSL library.

In some embodiments, the hardware abstraction layer 172 could switch from linking a first driver 192 to linking a second driver 194. The application 150 and the application framework 160 will not be aware of the switch of the drivers. In addition, after the virtual device (input virtual device or output virtual device) of the electronic device 100 has been developed, the application 150 is capable of connecting and cross-mounting the virtual device through the hardware abstraction layer 172. For example, in one embodiment, the application 150 operates with its own hardware 180, such as a camera, with a first driver 192. Afterwards, the electronic device 100 establishes a virtual device relating to a camera with higher resolution of another electronic device. The hardware abstraction layer 172 is modified for the electronic device 100 to seamlessly cross-mount the virtual device as its built-in peripheral hardware. Specifically, the path 132 in the memory 130 associated with hardware abstraction layer 172 is modified to point the operation of the application 150 to a second driver 194, and the second driver 194 is different from the first driver 192. Specifically, the hardware abstraction layer 172 is capable of mapping many specifications of the hardware of the providing electronic device 100B. Because the hardware abstraction layer 172 maps specifications of the hardware and links its corresponding driver, the input virtual device 174 of the demanding electronic device 100A could simulate the real hardware of the providing electronic device 100B through the hardware abstraction layer 172.

In this embodiment, the second driver 194 is associated with the established virtual device, and the hardware abstraction layer 172 links with the second driver 194 rather than the first driver 192. In other words, the first driver 192 is temporarily disabled. In addition, when the virtual device is dismounted and another electronic device is out of range, the electronic device 100 restores an original path for the first driver 192. The electronic device 100 seamlessly restores the associated memory 130 of the hardware abstraction layer 172 as per the original configuration. In the original configuration, the hardware abstraction layer 172 links with the first driver 192. It should be noted that the hardware abstraction layer 172 is merely for illustration, not for limitation. Similar algorithms and mechanisms could also be applied for a different OS and different devices to perform the same function.

Figure 6A:
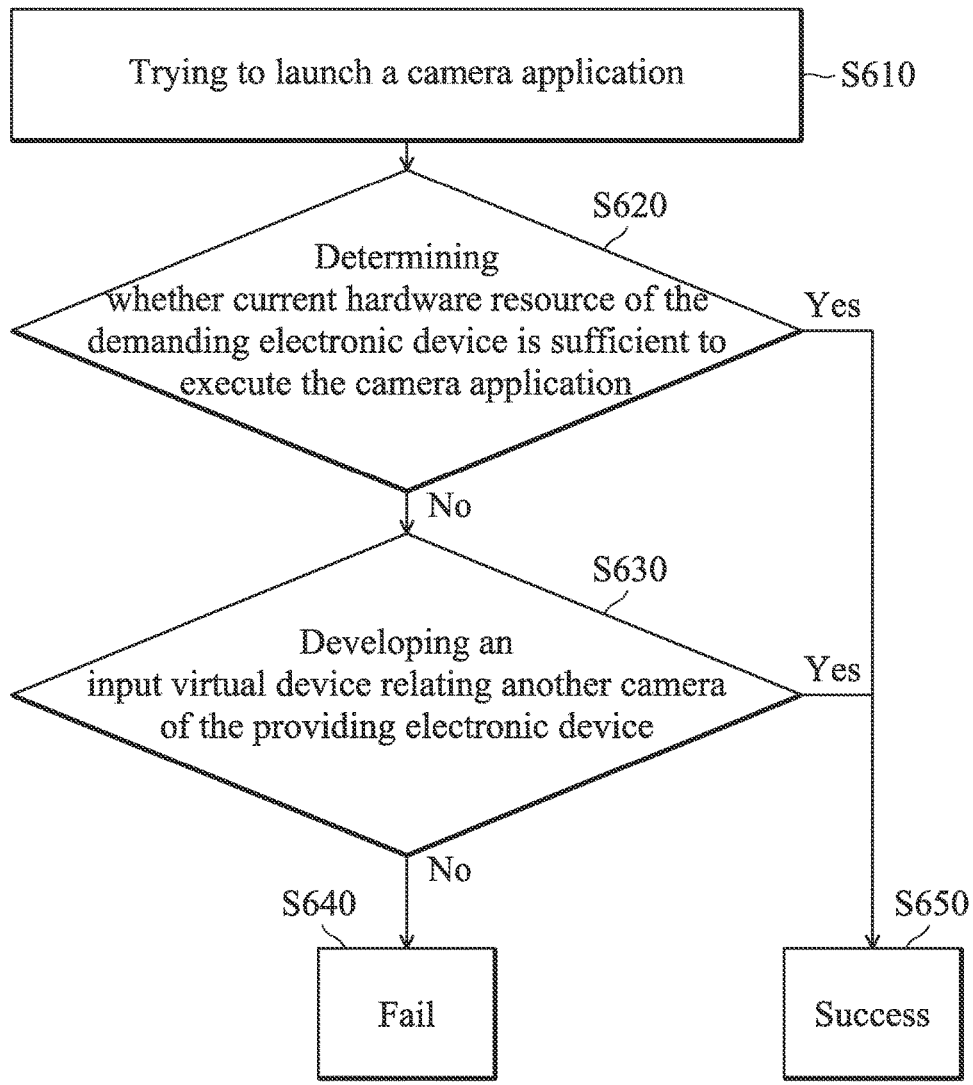
FIG. 6A is a flowchart illustrating a control method for a camera application according to an embodiment of the invention.

FIG. 6A is a flowchart illustrating a control method for a camera application according to an embodiment of the invention. In step S610, the user tries to launch a camera application. Afterwards, in step S620, a determination is made as to whether or not the current hardware resources of the demanding electronic device 100A are sufficient to execute the camera application. If the current hardware resources of the demanding electronic device 100A are sufficient to execute the camera application, the camera application will be launched successfully in step S650. If the current hardware resources of the demanding electronic device 100A are not sufficient to execute the camera application, step S630 is executed so that the demanding electronic device 100A develops an input virtual device relating another camera of the providing electronic device 100B. If the demanding electronic device 100A develops an input virtual device, the camera application will be launched successfully in step S650. If the demanding electronic device 100A does not develop an input virtual device, the camera application will not be launched successfully in step S640.

Figure 6B:
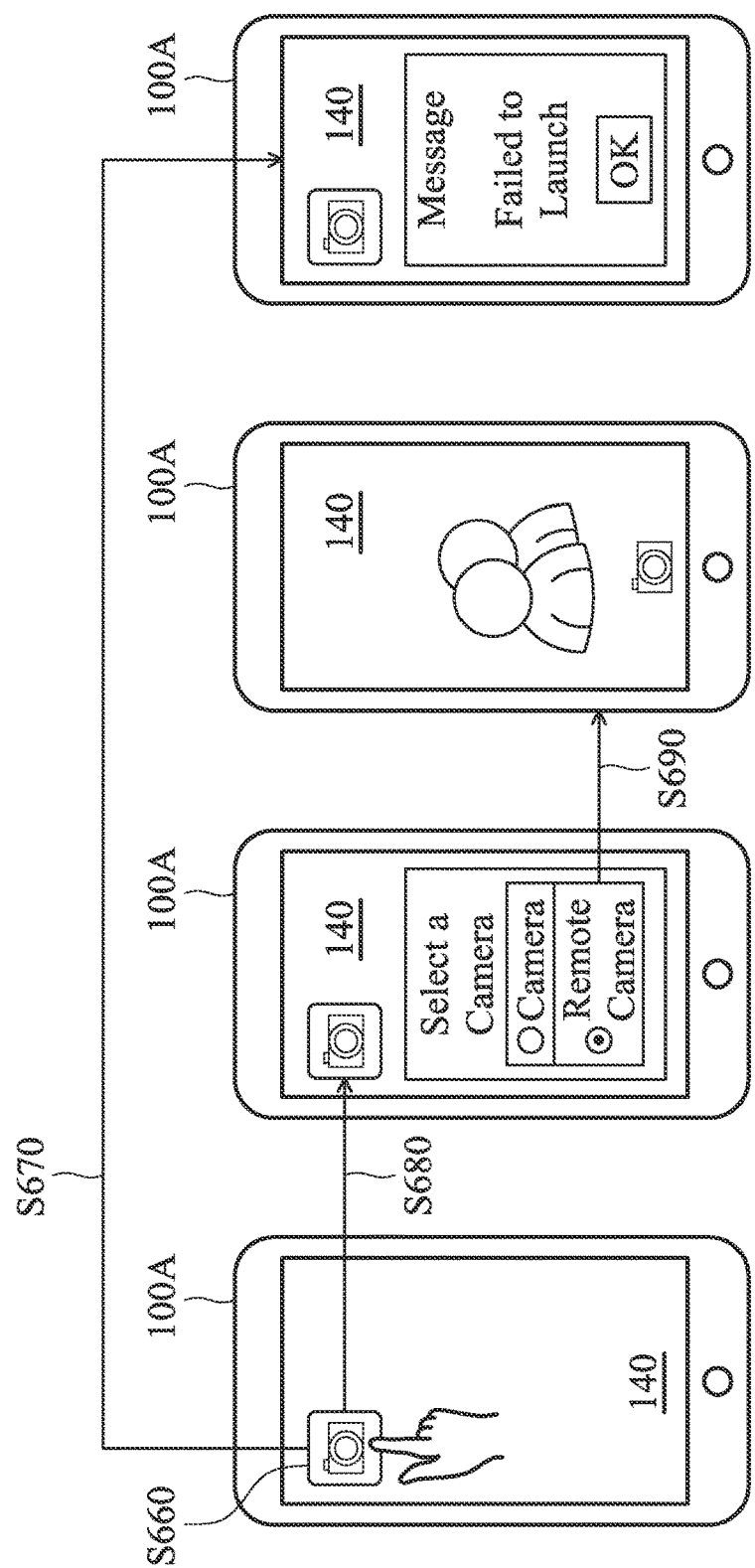
FIG. 6B is a schematic illustrating a control method for a camera application according to an embodiment of the invention.

FIG. 6B is a schematic illustrating a control method for a camera application according to an embodiment of the invention. In step S660, an icon of camera application is shown by the display 140 of the demanding electronic device 100A. If there is no appropriate hardware to launch the camera application, an error message will be displayed as shown in step S670. If the input virtual device 174 is established for utilizing the remote camera of the providing electronic device 100B, a list including the camera of the demanding electronic device 100A and the remote camera of the providing electronic device 100B will be displayed as shown in step S680. Afterwards, in step S690, the camera application will be started after selecting the camera or the remote camera.

In one embodiment, a user may carry a plurality of portable electronic devices 100A~100D such as a phone, a tablet (not shown), a wearable device or a wearable bracelet. These electronic devices 100A~100D can be clustered as a device group for cross-mounting. Seamless cross-mounting provided by the present invention improves user convenience and saves power. For example, the user can utilize the electronic device 100B to take a high-resolution photo by employing a camera equipped on the electronic device 100A. For example, the electronic device 100B cross-mounts the camera equipped on the phone electronic device 100A as its virtual camera device. The electronic device 100B reads data, e.g. a video stream, generated by the camera on the electronic device 100A through various communication methods such as Bluetooth low energy (BLE), Bluetooth, Wi-Fi, HDMI, USB and RFID.

In another embodiment, a 5.1 surround sound system can be realized by the cross-mounting of a plurality of electronic devices. By collecting six electronic devices and placing them at rough positions, 5.1 surround sound system can be emulated accordingly. For example, one of the electronic devices cross-mounts the other five speakers on the remaining electronic devices, and it is placed at the center speaker position. The other five electronic devices are placed at the front left, the front right, the rear left, the rear right and the subwoofer positions to the center position respectively. The six electronic devices together operate as the 5.1 surround sound system through their respective speakers. Preferably, the electronic device at center speaker position can also provide a video display for all users. Preferably, the six electronic devices may perform a sound calibration to provide a better sound output. It should be understood that the invention is not limited to the disclosed embodiments. On the contrary, it is intended to cover various modifications and similar arrangements, e.g. 2.1 or 7.1 surrounding sound system with sufficient electronic devices.

In another embodiment, panoramic photography can be easily realized by cross-mounting a plurality of electronic devices. By collecting a plurality of electronic devices and placing them at rough positions, panoramic photography can be performed with one shot. For example, one of the electronic devices cross-mounts the cameras on other remaining electronic devices. Preferably, the electronic device may also cross-mount position sensors on the remaining electronic devices to perform a position calibration to provide good, quick panoramic photography. It should be understood that the invention is not limited to the disclosed embodiments. On the contrary, it is intended to cover various modifications and similar arrangements such as the 3D photography.

In another embodiment, flexible self-photography can be realized by cross-mounting a plurality of electronic devices. For example, user can cross-mount the demanding electronic device 100A with the camera on the providing electronic device 100B. The providing electronic device 100B may possess two or more cameras. Preferably, the demanding electronic device 100A cross-mounts the camera on the providing electronic device 100B with higher resolution. The demanding electronic device 100A can freely preview the image captured by the camera on the providing electronic device 100B. Thus, the user is not limited by always previewing the image on the providing electronic device 100B.

The invention discloses a cross-platform mechanism of mounting one or more electronic devices. By utilizing the control method of the present invention, all electronic devices are allowed to execute any kind of application without hardware limitation by mounting other electronic devices. The control method of the invention includes setting up virtual devices automatically, simulating a real hardware via the virtual devices for executing the specific application, and transferring data between the input virtual device and the output virtual device automatically. Therefore, users don't need to install any particular custom applications in order to utilize the remote hardware of other electronic devices.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A control method for a demanding electronic device to execute an application and use a first peripheral component of a providing electronic device on the demanding electronic device, comprising:
   determining whether current hardware resources of the demanding electronic device are sufficient to execute the application;
   responsive to determining that the current hardware resources of the demanding device are insufficient to execute the application, establishing an input virtual device on the demanding electronic device for using the first peripheral component of the providing electronic device as if it was a built-in peripheral component of the demanding electronic device, wherein the providing electronic device is physically separated from the demanding electronic device, wherein the input virtual device interacts with an operating system executing on the demanding electronic device for emulating hardware functionality of the peripheral of the providing electronic device;
   modifying or switching a hardware abstraction layer to seamlessly cross-mount the first peripheral component; and
   providing data to the providing electronic device or accessing data from the providing electronic device via the input virtual device, wherein the data corresponds to the application.

2. The control method as claimed in claim 1, further comprising searching for the providing electronic device via the demanding electronic device before the step of establishing the input virtual device on the demanding electronic device.

3. The control method as claimed in claim 2, further comprising authenticating the providing electronic device and establishing a connection with the providing electronic device via the demanding electronic device after the step of searching for the providing electronic device.

4. The control method as claimed in claim 3, further comprising exchanging information about the first peripheral of the providing electronic device after the step of authenticating and establishing the connection with the providing electronic device.

5. The control method as claimed in claim 1, wherein the input virtual device comprises program codes of software and/or firmware of the demanding electronic device.

6. A control method for a providing electronic device to support a demanding electronic device for executing an application and use a first peripheral component of a providing electronic device on the demanding electronic device, comprising:
   establishing an output virtual device on the providing electronic device for transmitting data from a first peripheral component of the providing electronic device to the demanding electronic device, wherein a hardware abstraction layer of the demanding electronic device is modified or switched to seamlessly cross-mount the first peripheral component, and the providing electronic device is physically separated from the demanding electronic device, wherein the input virtual device interacts with an operating system executing on the demanding electronic device for emulating hardware functionality of the peripheral of the providing electronic device; and
   transmitting the data from the first peripheral component of the providing electronic device to the demanding electronic device via the output virtual device, wherein the first peripheral of the providing electronic device is utilized as if it was a built-in peripheral of the demanding electronic device and the data corresponds to the application.

7. The control method as claimed in claim 6, further comprising feeding back a search for the providing electronic device provided by the demanding electronic device before the step of establishing the output virtual device on the providing electronic device.

8. The control method as claimed in claim 7, further comprising authenticating the demanding electronic device and establishing a connection with the demanding electronic device via the providing electronic device after the step of feeding back the search for the providing electronic device.

9. The control method as claimed in claim 8, further comprising exchanging information about the first peripheral of the providing electronic device after the step of authenticating and establishing the connection with the providing electronic device.

10. The control method as claimed in claim 6, wherein the output virtual device comprises program codes of software and/or firmware of the providing electronic device.

11. A system for accessing data among at least two different electronic devices, comprising:
a demanding electronic device, configured for:
determining whether current hardware resources of the demanding electronic device are sufficient to execute an application; and
responsive to determining that the current hardware resources of the demanding device are insufficient to execute the application, establishing an input virtual device to execute an application from a providing electronic device on the demanding electronic device as if it was a built-in peripheral component of the demanding electronic device, and modifying or switching a hardware abstraction layer to seamlessly cross-mount the built-in peripheral component, wherein the input virtual device interacts with an operating system executing on the demanding electronic device for emulating hardware functionality of the peripheral of the providing electronic device; and
the providing electronic device, establishing an output virtual device for transmitting data from the providing electronic device to the demanding electronic device via the output virtual device, wherein the data corresponds to the application, and the providing electronic device is physically separated from the demanding electronic device.

12. The system as claimed in claim 11, wherein the input virtual device is established to use a first peripheral of the providing electronic device as a built-in peripheral of the demanding electronic device.

13. The system as claimed in claim 12, wherein the demanding electronic device searches for the providing electronic device before it establishes the input virtual device.

14. The system as claimed in claim 13, wherein the demanding electronic device authenticates the providing electronic device and establishes a connection with the providing electronic device after it searches for the providing electronic device.

15. The system as claimed in claim 14, wherein the demanding electronic device exchanges information about the first peripheral of the providing electronic device after it authenticates and establishes a connection with the providing electronic device.

16. The system as claimed in claim 11, wherein each of the input virtual device and the output virtual device comprises program codes of software and/or firmware of the demanding electronic device.

* * * * *